United States Patent [19]

Bouvet et al.

[11] 4,369,804

[45] Jan. 25, 1983

[54] ELECTROHYDRAULIC TRANSLATION APPARATUS, IN PARTICULAR PERMITTING CONTROL OF A PRESSURE IN AN AUTOMATIC TRANSMISSION

[75] Inventors: Jean M. Bouvet, Boulogne-Billancourt; Philippe Quemerais, Thurins, both of France

[73] Assignee: Regie Nationale Des Usines Renault, Boulogne-Billancourt, France

[21] Appl. No.: 209,230

[22] PCT Filed: Jan. 17, 1980

[86] PCT No.: PCT/FR80/00006

§ 371 Date: Sep. 18, 1980

§ 102(e) Date: Sep. 15, 1980

[87] PCT Pub. No.: WO80/01502

PCT Pub. Date: Jul. 24, 1980

[30] Foreign Application Priority Data

Jan. 18, 1979 [FR] France .............................. 79 01267

[51] Int. Cl.³ .............................................. G05D 16/00
[52] U.S. Cl. .................................. 137/85; 137/624.15
[58] Field of Search ................. 137/82, 85, 624.15, 137/625.64, 625.65, 624.13; 251/129

[56] References Cited

U.S. PATENT DOCUMENTS

| | | | |
|---|---|---|---|
| 3,099,995 | 8/1903 | Raufenbarth | 137/82 |
| 3,476,128 | 11/1969 | Barker | 137/624.15 X |
| 3,529,620 | 9/1970 | Leiber | 137/625.65 X |
| 3,621,862 | 11/1971 | Wojtecki | 137/82 X |

*Primary Examiner*—Alan Cohan
*Attorney, Agent, or Firm*—Beveridge, DeGrandi & Kline

[57] ABSTRACT

An electromagnetic coil 29 exerts an attractive force on a movable plate 30 of magnetic material, within which is mounted a ball 32 of non-magnetic material blocking the end of a passage 33 for the hydraulic fluid. The apparatus also comprises electronic means for supplying the coil 29 by means of a pulsed unidirectional current, the mark/space ratio and mean value of which are subject to control by an operating magnitude represented by an electric control signal. The apparatus can be utilized as a hydraulic potentiometer for the determination of a control pressure proportional to an electric control signal in a hydraulic control circuit of an automatic transmission of industrial vehicles.

22 Claims, 5 Drawing Figures

ELECTROHYDRAULIC TRANSLATION APPARATUS, IN PARTICULAR PERMITTING CONTROL OF A PRESSURE IN AN AUTOMATIC TRANSMISSION

The present invention relates to an electrohydraulic translation apparatus comprising an electrically controlled valve body associated with an electronic control generator permitting a pressure to be obtained which is proportional to an electrical control magnitude. Such an apparatus can be utilized, in particular, for monitoring a hydraulic pressure in the control circuit of an automatic transmission, in particular, in a hydraulically controlled automatic gearbox for industrial vehicles.

In automatic gearboxes of this type, the hydraulic control system usually comprises one or more regulating valves intended to regulate one or more pressures to an optimum level corresponding to a predetermined operating mode. These regulating valves are most often controlled by an auxiliary pressure, termed the control pressure. This auxiliary pressure should be proportional to an electrical magnitude representative of the operating conditions of the vehicle, such as, for example, the rotational speed of the turbine of the hydrokinetic converter comprised by the gearbox, the vehicle speed, the engine load, etc. It is thus necessary to cause the control pressure supplied to the regulating valve to vary with precision, so as to follow perfectly the course of the electrical control signal.

Various electrohydraulic apparatuses have already been proposed for obtaining a pressure proportional to such an electrical control signal. To obtain satisfactory performance, it is necessary to utilize complicated and expensive structures. Such apparatuses, known as servo-valves, are utilized in high-cost servo-mechanisms in aeronautics, astronautics, robots, etc. Apparatuses of this type utilized in the present industrial field should be more economical and hence of simplified construction. Because of this, the conventional apparatuses are not in general capable of causing the hydraulic pressure to vary with the desired precision and reproducibility as a function of the variations of the electrical signal.

Certain conventional apparatuses utilize, for example, an electromagnetic attractive force acting on a movable part. These apparatuses, however, have little precision; their operation causes a delay to occur in the response to a control signal. This hysteresis, probably arising both from the magnetic circuit utilized and from the hydraulic system, alters the precision of pressure regulation. Apparatuses of this type are complex in practice, and thus costly, which limits the possibility of adapting them to automatic gear-boxes. Moreover, they are frequently sensitive to external stresses, and in particular to vibrations.

The object of the present invention is a particularly economical electrohydraulic translating apparatus, enabling a pressure to be varied proportionally to an electrical control signal, and which is easy to construct and very simple, and also which exhibits no hysteresis and has a low sensitivity to vibrations, thus ensuring excellent reproducibility of the results.

The electrohydraulic translating apparatus according to the invention and enabling a pressure to be obtained proportional to a control signal comprises a movable part subjected to a magnetic attractive force. According to the invention, the apparatus furthermore comprises means to cause the magnetic attractive force to vary periodically as a function of the control signal, such as to subject the movable part to a vibratory movement.

The apparatus preferably comprises an electronic servo-control current generator providing pulsed electrical signals of which the average value is under the control of the above-mentioned control signal.

In a preferred embodiment of the invention, the apparatus comprises an electromagnet coil mounted within a body of magnetic material having a fixed core provided with a central passage for the hydraulic fluid and a ball which can be displaced to block the said passage. The aforesaid ball, made of a non-magnetic material, is maintained in a mounting of a plate of magnetic material subjected to the attractive force of the electromagnet coil. The apparatus furthermore comprises an electronic control generator to supply the said coil with pulsed electrical signals, the mean value of which is under the control of the aforesaid control signal. A vibratory movement of the plate is thus obtained, and because of this, almost complete suppression of the hysteresis which affected the prior art apparatuses is observed.

The electromagnetic attractive force acting on the movable plate and, because of this, on the ball, is proportional to the current supplying the electromagnet coil. This current, which according to the invention is in one direction and pulsed, exhibits on this account oscillations of predetermined amplitude and frequency. For a further reduction of the overall hysteresis of the system, a magnetic material having a very low percentage of carbon after appropriate annealing is preferably utilized for the magnetic circuit of the apparatus.

The movable plate preferably has in its central part channels which pass through the said plate and end at the periphery of the mounting intended to receive the ball. In this way, these channels cannot be blocked by the ball, whatever its position.

In the apparatus of the present invention, the blocking ball is disposed between the vibrating plate and the end of the magnetic body. Under these conditions, the blocking ball is subjected, via the vibrating plate, to the magnetic attraction of the coil tending to close the hydraulic passage. The blocking ball is likewise subjected to a hydraulic repulsive force due to the passage of the fluid and acting on the ball in a direction which tends to open the hydraulic passage.

Another important characteristic of the invention resides in the particular mounting of the vibrating plate disposed adjacent the front end of the coil. In fact, according to the invention, the vibrating plate is completely free, with a slight peripheral play within a mounting formed at the end of the magnetic body. The plate, which is thus only subjected to the magnetic attraction of the coil supplied with unidirectional pulsed signals, behaves like a vane having a fictitious and indefinite articulation at a fixed joint.

In a preferred embodiment, the periphery of the movable plate is surrounded by a ring of non-magnetic material integral with the extreme edges of the body of the apparatus. In addition, the peripheral surface of the plate advantageously has a clearance which prevents it from jamming within the aforesaid ring during the vibratory movement to which the movable plate of the invention is subjected.

The electronic control generator of the apparatus of the invention preferably comprises a circuit for bringing the mean value of the current in the electromagnet coil under the control of the operating value constituted by the control signal. The electronic generator likewise has a comparator which receives the output signal of the control circuit as well as an external periodic signal. It is thus possible, by means of this current control, to input into the electromagnet coil pulsed signals whose mean value is under the control of the operating magnitude. The electromagnetic attractive force acting on the plate and, consequently, on the ball is thus proportional to this current.

In a preferred embodiment, the control circuit also comprises a secondary return loop receiving the instantaneous value of the current passing through the electromagnet coil.

A particularly important application of the electrohydraulic translating device of the invention is the control of pressure in a hydraulic control circuit of an automatic transmission. The non-magnetic ball subjected to the action of the movable vibrating plate of the apparatus of the invention in fact cooperates with a ball seating and thus constitutes, because of this, a variable-restriction orifice able to form one of the elements of a hydraulic potentiometer. The force acting on the ball via the movable vibrating plate being proportional to the mean value of the current passing through the electromagnet coil, the pressure resulting from it in the hydraulic circuit is proportional to the control magnitude, that is, to the electrical control signal. This pressure is free from any hysteresis and is independent of external disturbances such as variation of the supply voltage, variation of the temperature of the hydraulic fluid, causing a variation of the temperature of the winding of the electromagnet, etc.

The present invention will be better understood on studying a preferred embodiment of an apparatus according to the invention applied to an automatic transmission, as described in detail and taken as an example which is in no way limitative. The description will be illustrated by the attached drawings, on which:

Figure 1:
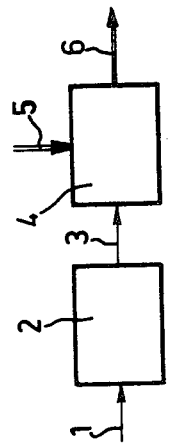
FIG. 1 represents, very schematically, the disposition of the electrohydraulic translator apparatus according to the invention comprising the current servo circuit which is associated with it.

As shown in FIG. 1, the apparatus of the invention comprises a block 2, effecting current servo-control, and a block 4 including all the hydraulic elements of the translator of the invention. Block 2 receives an electrical control signal playing the part of a control signal referenced 1. Block 2 supplies a calibrated control current 3 to an electromagnet coil constituting one of the elements of block 4. In this embodiment, block 4, supplied with hydraulic fluid 5, provides at its output a calibrated pressure 6 proportional to the control magnitude 1.

Figure 2:
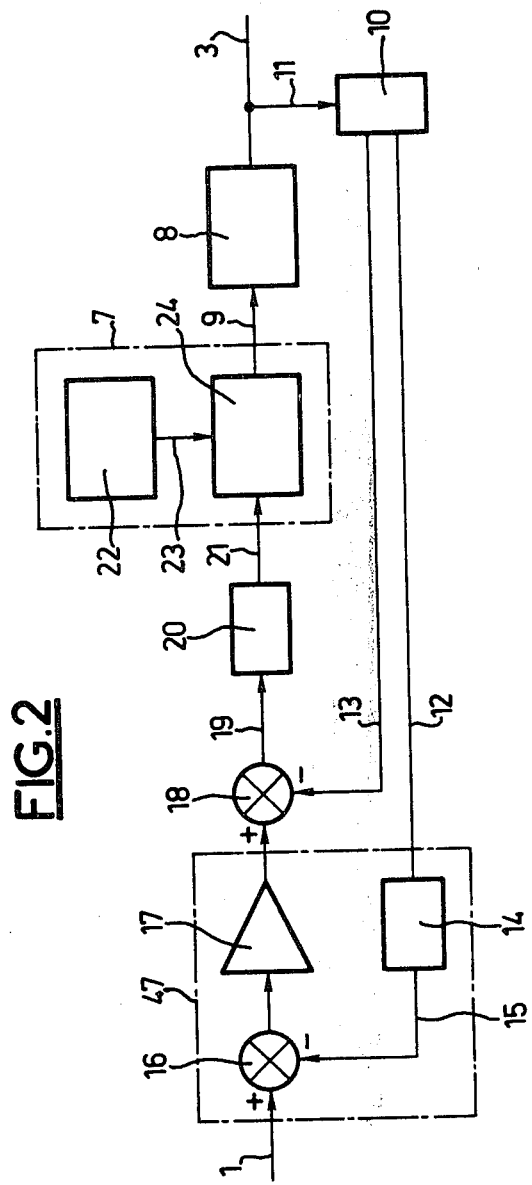
FIG. 2 shows a block diagram of the current servo circuit, having the two feedback loops and delivering the control signal to the electromagnet coil.

As shown on the block diagram of FIG. 2, the electronic control generator generator indicated as a whole by 2 in FIG. 1 takes the form of a servo-circuit comprising in its direct path a block, referenced 7 as a whole, which is a voltage/duration converter. Block 7 supplies rectangular control signals, of predetermined and constant frequency and of variable mark/space ratio, to a power circuit 8 connected via the connection 9 to the electromagnet coil. These signals cause, in the electromagnet coil, a pulsed current 3 which is measured by the block 10 which receives this current via connection 11. Block 10 supplies an output signal, on the one hand to a main feedback loop 12 and on the other hand to a secondary feedback loop 13 intended to improve the response time of the overall system. The main feedback loop 12 comprises an integrating circuit 14 which provides a direct current voltage which is the image of the mean current, referenced 3, in the electromagnet coil. This direct current voltage, carried by connection 15, is compared to the operating magnitude 1 in a comparator 16 which provides at its output an error signal, the voltage of which is amplified by an amplifier element 17. The output of the amplifier 17 is connected to one of the inputs of a second comparator 18, which compares the error voltage from amplifier 17 with the signal coming from the secondary feedback loop 13. The voltage of the error signal from the comparator 18 is transmitted via connection 19 to a block 20 which constitutes a conventional correction circuit able to improve the stability of the servo-controlled system and also its performance from the point of view of regulation. The resulting signal transmitted via connection 21 controls the previously-mentioned voltage/duration converter 7. This generator 7 comprises an oscillator 22 supplying triangular signals of given constant frequency. These signals are transmitted via connection 23 to a comparator element 24, where they are compared to the direct current voltage arising from the correction circuit 20 and transmitted via connection 21. Rectangular signals are obtained at the output of the comparator 24, with a frequency identical to that of the signals supplied by the oscillator 22 and of amplitude proportional to the voltage of the signal coming from the correction circuit 20.

In this way, the electronic control generator enables the electrohydraulic translation apparatus to be controlled with pulsed signals, enabling the problems of hysteresis and of variations due to the supply voltage and the temperature of the windings to be avoided.

Figure 3:
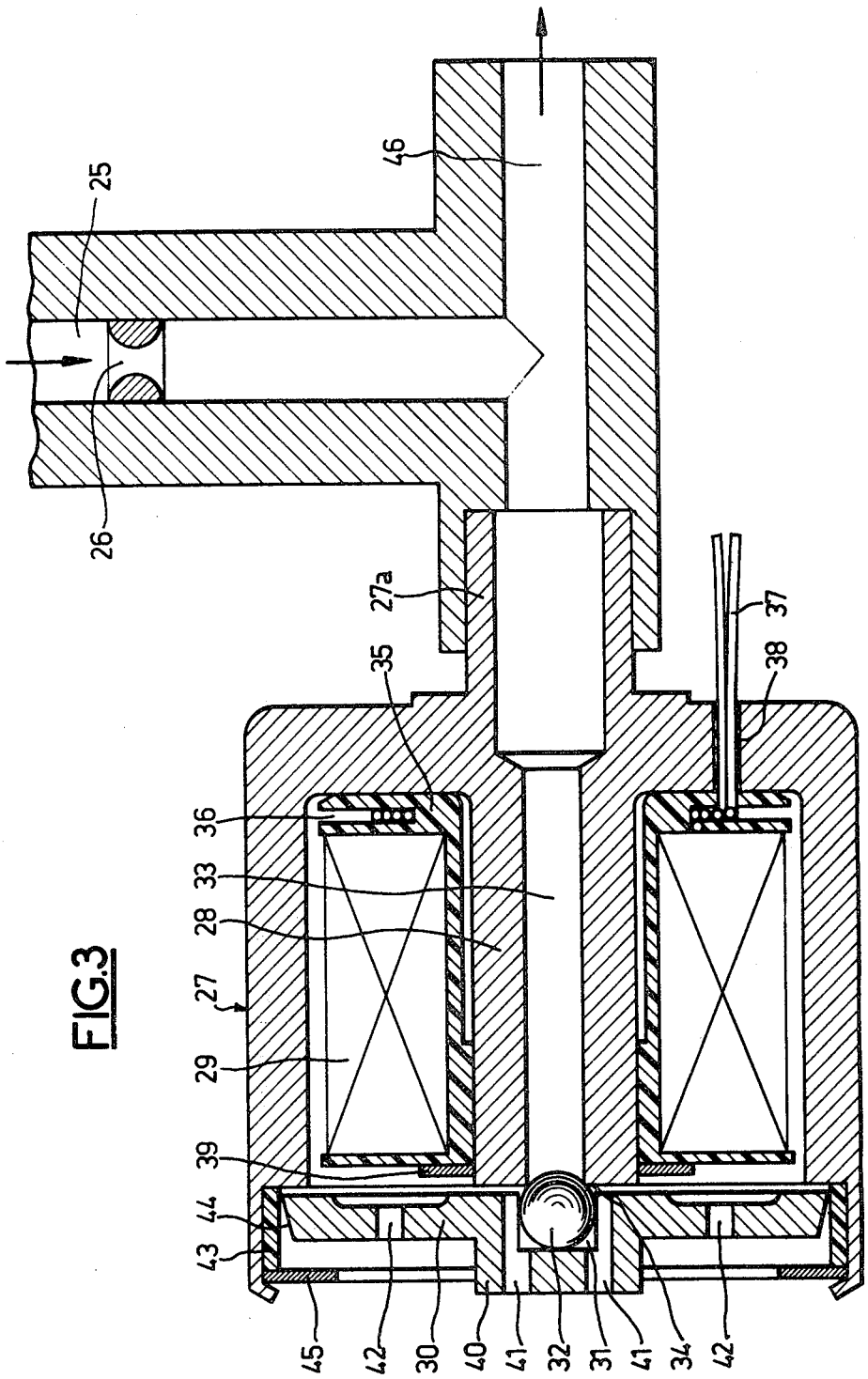
FIG. 3 shows schematically the embodiment of the hydraulic part of the plate electrohydraulic translation apparatus.

As shown in FIG. 3, the assembly of block 4 of FIG. 1 is constituted by a hydraulic potentiometer, the principle of which is known, with proportional electric control. The hydraulic fluid under pressure enters via channel 25, which has a first restriction orifice 26. An electromagnet has a body 27 which is generally in the form of a hollow cylinder made of magnetic material, which can, for example, be pure iron. The body 27 has a fixed core 28 substantially in its axis. The electromagnet likewise comprises a coil 29 and a plate 30 made of magnetic material and disposed in the vicinity of the front end of the coil 29, and having, substantially in its axis, a mounting 31 receiving a ball 32 made of non-magnetic material and playing the part of a stopper for the open end of a central passage 33 formed in the fixed core 28. The ball 32 is mounted between the plate 30 and the core 28 of the coil 29.

The space comprised between the non-magnetic ball 32 and the ball seating 34 constitutes the variable restriction orifice of the hydraulic potentiometer.

The magnetic material constituting the body 27 of the electromagnet preferably receives a special annealing after machining, resulting in a considerable diminution of the hysteresis losses within the magnetic circuit. The body 27 defines around the core 28 a cylindrical envelope, within which is mounted the casing 35 of the electromagnet coil 29. The body 27 likewise has a connecting nipple 27a for mounting a hydraulic fluid supply channel communicating with the central passage 33. The casing 35 is of non-magnetic material, such as plastics, for example. One of the radial flanks of the casing 35 comes into contact with the closed bottom part of the cylindrical envelope of the body 27 and comprises a narrow radial throat 36, within which the supply wires of the coil 29 are connected to the external supply wires 37. The supply wires 37 are conducted to the exterior of the body 27 via a hole 38 pierced in the closed bottom part of the body 27. This disposition of exit connections has the advantage of reducing the dead space due to connecting wires. This disposition thus permits a maximum of turns to be wound in the space comprised between the outer envelope of the body 27, the central core 28 and the casing 35, i.e. to obtain the maximum electromagnetic attractive force for a given current.

The casing 35 containing the winding 29 is held in place by a washer 39 of nonmagnetic material which is a force fit on the central core 28.

At the open end of the body 27 is placed the plate 30, the facing front face of which is kept at a certain minimum spacing from the corresponding front face of the body 27 and of the core 28, even in the position of the ball 32 on its seating 34 corresponding to blocking of the passage 33. The plate 30 is constituted of the same magnetic material as the body 27; it is likewise preferably annealed after machining. The plate 30 thus constitutes the movable part of the magnetic circuit constituted by the body 27 and the central core 28, the whole assembly having its hysteresis losses reduced to the greatest possible extent, taking into account the above-mentioned annealing.

It is essential for the ball 32, kept in its mounting 31, to be made of non-magnetic material (beryllium copper, glass, aluminum, or porcelain) so as not to disturb the magnetic circuit as defined above. The bore of the mounting 31 is made so as to permit a suitable movement with slight play of the ball 32 within the said mounting. The central part 40 of the plate 30 furthermore has four peripheral channels 41 passing through the central part 40 and opening at the periphery of the mounting 31. These peripheral channels 41 permit removal of hydraulic fluid passing through the central passage 33, and the consequent avoidance of any parasitic force, due to the moving hydraulic fluid, on the central part of the plate 30. It will be noted that the peripheral disposition of the channels 41 enables any blockage by the ball 32 to be avoided, whatever its position.

The plate 30 can furthermore comprise, as shown in the embodiment illustrated in FIG. 3, equidistant holes 42, for example, six in number, enabling the plate 30 to be made lighter to the limit set by a sufficient section to avoid any magnetic saturation.

It will be noted that the diameter of the ball 32 is slightly greater than the diameter of the central passage 33 carrying the hydraulic fluid. Moreover, the depth of the mounting which receives the ball is calculated such that there exists a minimum clearance between the central core 28 and the plate 30, even when the ball 32 comes into contact with its seating 34.

The open end of the body 27 receiving the movable plate 30 is machined such as to form a mounting which receives a thin ring of non-magnetic material interposed between the internal peripheral surface of the open part of the body 27 and the external peripheral surface of the plate 30. The presence of the non-magnetic ring 43 prevents radial magnetic adhesion of the plate 30 to the internal periphery of the open end of the body 27.

The external peripheral surface 44 of the plate 30 preferably has a machined relief. Further, the maximum diameter of the plate 30 enables a slight play to exist within the ring 43. In this way any jamming of the movable plate 30 within the ring 43 is avoided. Maintenance of the ring 43 in position and limitation of the outward displacement of the plate 30 are ensured by a closure ring 45 fixed by crimping at four points of the extreme edges of the outer envelope of the body 27. The plate 30 is thus mounted completely freely within the mounting at the end of the body 27, with a slight peripheral play with respect to the ring 43. The width of the ring 43 defines the dimensions of this mounting; the closure ring 45 simply prevents the plate from falling out of its mounting.

During operation of the apparatus, the current passed to the coil 29 is unidirectional and pulsed, and its mean value is under control of the control signal. The movable plate 30 is set in vibratory motion, during which the plate 30 locates itself within its mounting so as to contact at one point the facing surfaces of the magnetic circuit. The plate 30 thus acts as a vane having a fixed, fictitious articulation point situated at this point of contact.

The ball 32 is subjected, via the plate 30, to a dynamic electromagnetic attractive force tending to close the passage 33. Furthermore, the ball is subjected to a hydraulic repulsive force tending to open the passage 33. As a function of the current with which the coil 29 is supplied, the ball locates itself at a distance from the seating 34 such that the above-mentioned forces are in equilibrium. As in a conventional hydraulic potentiometer, there results a hydraulic pressure, at the exit 46 of the apparatus, which is a function of the input pressure in channel 25 and of the ratio of the two cross sections of the restriction orifices of the hydraulic potentiometer. The restriction 26 being fixed, it is possible to control the output pressure at 46 by varying, in the manner described, the position of the ball 32 with respect to its seating 34, i.e., by modifying the force exerted on the movable plate 30, a force which is proportional to the current passing through the coil 29.

It is to be noted that in this apparatus the advantages of a plate electromagnet, from the magnetic point of view, are added to those of a ball from the point of view of hydraulics and mechanical embodiment. In fact, the ball of non-magnetic material is a perfect volume of revolution which acts freely without a preferred position and without any particular constraint. The plate electromagnet, for its part, with its movable plate acting on the ball, is by definition simple. The effect obtained is proportional, in the present case, to the cross sections of the facing elements and to the clearance, and these elements can be mechanically defined with great precision.

In addition to this, the vibratory motion of the movable plate results in a stable system, the performance of which is independent of external stresses and in particular of vibrations to which the whole apparatus is frequently subjected in practice. The vibratory motion caused by the pulsed control current supplying the coil 29 also has the effect of considerably reducing the overall hysteresis of the system. Mounting of the plate within a mounting at the end of the magnetic body and without use of any supplementary support member permits a very simple and more compact design of the apparatus to be obtained.

Figure 4:
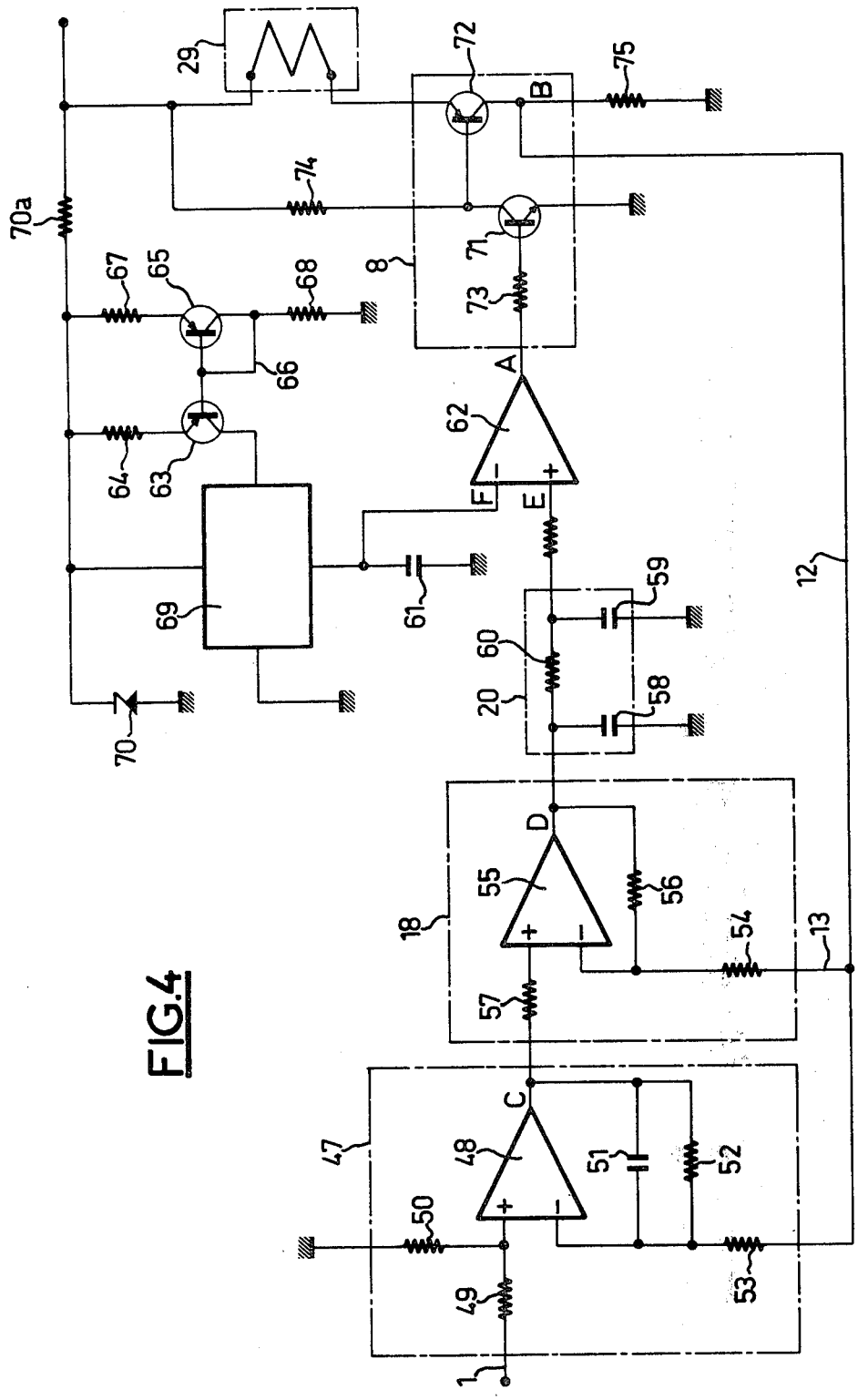
FIG. 4 illustrates a possible embodiment of the servo-circuit of FIG. 2.

FIG. 4 illustrates a preferred embodiment of certain elements of the electronic control generator of FIG. 2. Identical elements have the same reference numbers.

Block 47, which can also be seen in FIG. 2, comprises an operational amplifier which receives at its positive input the operating signal 1 via the voltage divider constituted by the resistances 49 and 50. The capacitor 51 mounted between the output and the negative input of the operational amplifier 48 constitutes an integrator; the resistance 52, connected to the leads of the capacitor 51, determined a negative feedback for the amplifier 48. Resistor 53, mounted in series at the negative input of the amplifier 48, determines its gain. At the output of the amplifier 48, which is connected as a differential amplifier, there is finally obtained a voltage resulting from the comparison of the operating magnitude 1 and the feedback signal, carried by the main feedback loop 12, which is the image of the current passing through the coil 29 of the electromagnet.

Figure 5:
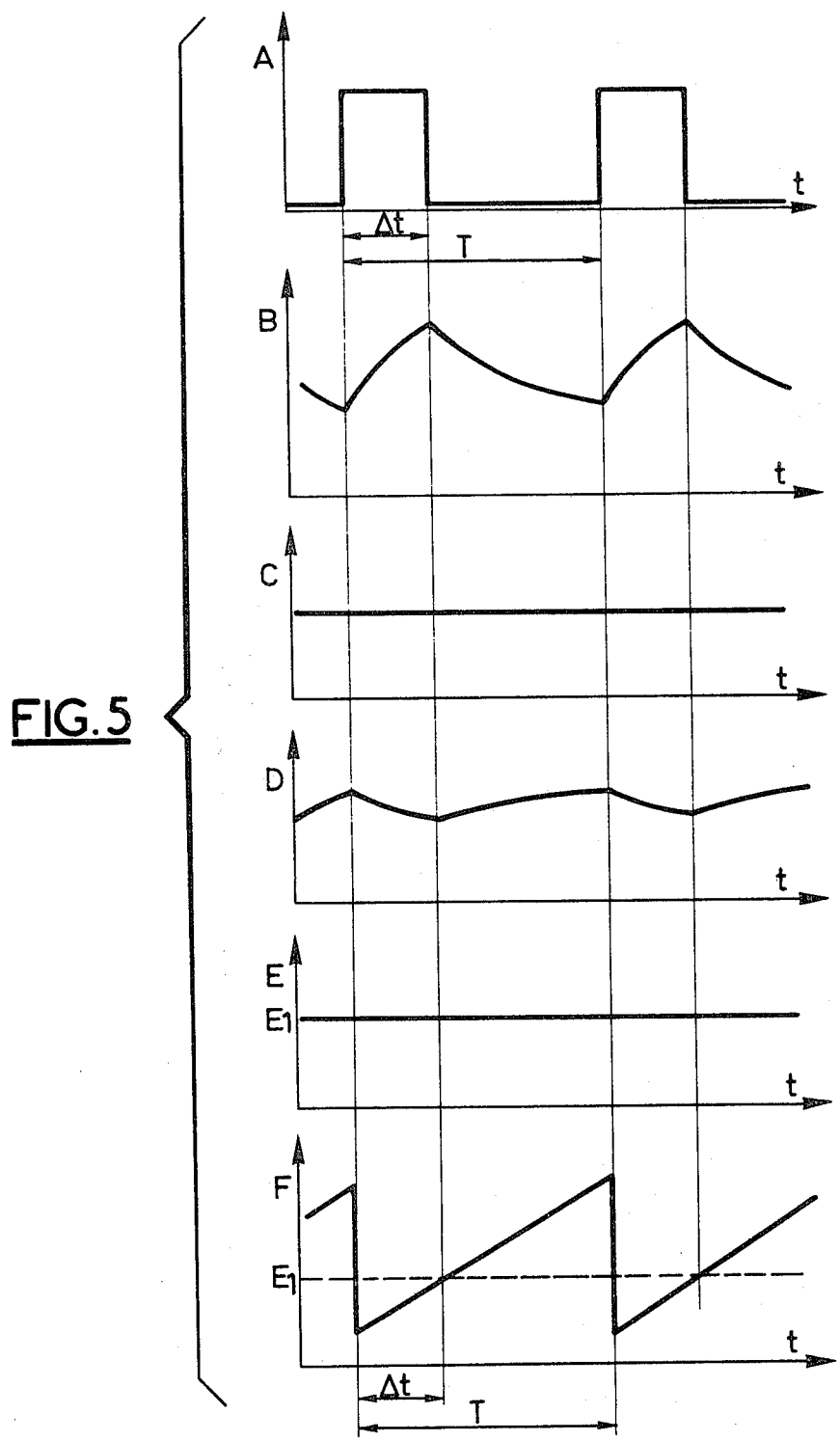
FIG. 5 illustrates the shape of certain signals, as a function of time, appearing at various points of the servo-circuit of FIG. 4.

The voltage which is the image of the instantaneous current in the coil 29 of the electromagnet is passed by resistor 54 to the negative input of the operational amplifier 55 having a feedback resistor 56. The operational amplifier 55, connected as a differential amplifier, receives in addition at its positive input, via resistor 57, the output signal C of the operational amplifier 48 (see FIG. 5). At the output of the ampifier 55 there is obtained a signal, the voltage D of which, shown in FIG. 5, is the resultant of the operating magnitude 1 and of magnitudes proportional both to the mean current and to the instantaneous current passing through the coil 29 of the electromagnet. The utilization of the secondary feedback loop 13 containing resistor 54 enables the servo performance, particularly the response time, to be improved.

The signal D coming from the amplifier 55 is passed to the correction circuit 20 comprising the two capacitors 58 and 59 and the resistor 60, conventionally connected to improve the stability of the servo-controlled system. The signal from the correction circuit 20, the voltage E of which is shown in FIG. 5, is compared with the voltage signal F taken off at the leads of the capacitor 61 by means of an element 62 connected as a comparator. The signal F which can be seen in FIG. 5 takes the form of a triangular signal of given period T. This triangular signal is obtained by charging capacitor 61 at constant current. This constant current charging is effected by the PNP transistor 63, the emitter of which is connected to the supply voltage via resistors 70a and 64 and the base of which is connected to the base of the PNP transistor 65. Transistor 65, the base and collector of which are short-circuited by the connection 66, enables a suitable temperature compensation to be made. The constant current charging the capacitor 61 is determined by the ratio of the resistor 67 and 68 respectively connected to the emitter and the collector of the transistor 65. Capacitor 61 is periodically discharged via the integrated circuit 69 connected as an astable multivibrator.

The whole of the circuit is supplied with a reference voltage defined by the zener diode 70.

Comparison of the d.c. voltage E, for example of level $E_1$, and the triangular signal F enables a rectangular signal A, which can be seen in FIG. 5, to be obtained at the comparator output 62, with a width $\Delta t$ proportional to the voltage level $E_1$ of the signal E. The period of the signal A is itself equal to the period T of the signal F.

In fact, if the signal F is greater than the level $E_1$ of signal E, the output of the comparator 62 is at a low level near zero. If, on the other hand, the signal F is lower than the level $E_1$ of the signal E, the comparator gives a high signal at its output.

Block 8 is a power circuit formed by the two transistors 71 and 72. The NPN transistor 71 receives the signal A at its base via the resistor 73 and has its collector connected via resistor 74 to one of the leads of the electromagnet coil 29. The base of the PNP transistor 72 is connected to the collector of transistor 71, while the other lead of the coil 29 is connected to the emitter of transistor 72. The power circuit 8 this enables the electromagnet coil 29 to be supplied. The current passing through the electromagnet coil 29, because of the self-induction of the circuit, has the form B as a function of time shown in FIG. 5. The current at the collector of transistor 72 is practically identical to the current passing through the induction coil 29. This current is taken off at the leads of a low resistance 75 connecting the collector of transistor 72 to ground. This sampled current (signal B in FIG. 5), because of its unidirectional pulsed structure, causes a strong electromagnetic attraction which communicates to plate 30 of FIG. 3 a vibratory motion of small amplitude.

In addition to this, the mark/space ratio of signal B, i.e. the ratio between the period $\Delta T$ during which the signal A is high and the period T, varies as a function of the voltage level $E_1$ of signal E, i.e., as a function of the operating value constituted by the voltage level of the electrical control signal referenced 1 in the Figures.

There is thus obtained, by means of the particular structure of the electrohydraulic plate translator according to the invention and of its associated electronic control generator which supplies a servo-controlled, pulsed current, a hydraulic pressure in strict conformity with the operating magnitude given by an electrical control signal, this hydraulic pressure being furthermore independent of all external disturbances and in particular of any vibration.

We claim:
1. An electrohydraulic transducer, comprising,
   a body of magnetic material having a core provided with a fluid passage extending therethrough to an outlet opening which is located at one end of the core, means defining a recess at one end of the body, said outlet opening being located within said recess,
   an electromagnetic coil means mounted on said core,
   a substantially flat movable magnetic element mounted for free vibrating movement within said recess, said magnetic element having in its central portion an open recess with a through passage,
   a nonmagnetic ball mounted within said open recess of said movable magnetic element at a position between said outlet opening and said movable magnetic element,
   means for energizing said electromagnetic coil means with a unidirectional pulsed electric current which is permanently controlled in response to an input electric signal and is operable to vibrate said movable magnetic element, said movable magnetic element being operable upon said ball to counteract the hydraulic force of fluid and to control the pressure within said fluid passage by controlling the rate of fluid flow through the outlet opening.

2. A transducer according to claim 1 in combination with an automobile transmission which has a hydraulic control circuit, said transducer being located in said hydraulic control circuit, said ball and said outlet opening comprising a variable restriction of a hydraulic potentiometer.

3. Apparatus according to claim 1 or claim 2 including a magnetic portion associated with said body, said magnetic portion being positioned where it will be contacted by said movable magnetic element during the portion of vibratory movement when said movable magnetic element is moving away from said outlet opening.

4. Apparatus according to claim 1 or claim 2 wherein the through passage of the open recess in the movable magnetic element includes channels which extend through the plate, said channels being positioned where they cannot be obstructed by the ball in any position.

5. Apparatus according to claim 1 or claim 2 wherein the body has a ring of nonmagnetic material which faces radially toward said movable magnetic element, said ring being spaced from the edges of the movable magnetic element to allow for slight peripheral play.

6. Apparatus according to claim 1 or claim 2 wherein said movable magnetic element has a relief which prevents it from jamming during its vibratory motion.

7. Apparatus according to claim 1 or claim 2 wherein the open recess is dimensioned so that, when the ball is in contact with the core at said outlet opening, the movable magnetic element is separated from the core by a clearance space.

8. Apparatus according to claim 1 or claim 2 wherein the means for energizing the coil is operable to produce unidirectional signals of fixed periods, said energizing means being operable in response to changes in the voltage of said input electric signal to vary the mark/space ratio of said unidirectional signals.

9. Apparatus according to claim 8 wherein the energizing means includes a servo-control circuit for providing an output signal which is the mean value of the current supplying the coil with respect to the operating value constituted by the input electric signal, means for providing an external periodic signal, and a comparator for receiving the output signal of the servo-control circuit and said external periodic signal.

10. Apparatus according to claim 9 wherein said servo-control circuit has a secondary feedback loop for providing an instantaneous value of the current in the electromagnetic coil means.

11. Apparatus according to claim 9 wherein the servo control circuit has a voltage-to-duration converter including a capacitor which is charged at a constant current, said means for providing an external signal comprising an astable multivibrator means for periodically discharging said capacitor.

12. Apparatus according to claim 9 wherein the servo-control circuit includes a main feedback loop which includes an integrator for supplying a signal representing the mean value of the current in the electromagnetic coil means.

13. A hydraulic control circuit for an automatic transmission, comprising,
an input channel for receiving hydraulic fluid under pressure, a first output channel connected to said input channel, a transducer having a fluid passage which provides a second output channel, said second output channel being connected to said input channel,
said transducer having a body of magnetic material with a core, said fluid passage of the transducer extending through the core to an outlet opening which is located at one end of the core, means defining a recess at one end of the body, said outlet opening being located within said recess,
an electromagnetic coil means mounted on said core,
a substantially flat movable magnetic element mounted for free vibrating movement within said recess, said magnetic element having in its central portion an open recess with a through passage,
a nonmagnetic ball mounted within said open recess of said movable magnetic element at a position between said outlet opening and said movable magnetic element,
means for energizing said electromagnetic coil means with a unidirectional pulsed electric current which is permanently controlled in response to an input electric signal and is operable to vibrate said movable magnetic element,
said movable magnetic element being operable upon said ball to counteract the hydraulic force of fluid from said passage and to control the pressure within said first and second output channels by controlling the rate of fluid flow through the outlet opening.

14. A hydraulic control circuit according to claim 13 having a restriction means in said input channel upstream of the output channels.

15. An electrohydraulic transducer, comprising,
a body of magnetic material having a core provided with a fluid passage extending therethrough to an outlet opening which is located at one end of the core,
an electromagnetic coil means mounted on said core,
a substantially flat movable magnetic element mounted at said one end of the core,
a nonmagnetic closure member mounted between said movable magnetic element and said outlet opening,
means for energizing said electomagnetic coil means with a unidirectional pulsed electric current which is operable to vibrate said movable magnetic element,
said movable magnetic element, when vibrated, biasing the closure member to counteract the hydraulic force of fluid from the fluid passage, and controlling the pressure within said fluid passage by controlling the rate of fluid flow through the outlet opening.

16. Apparatus according to claim 15 wherein the means for energizing the coil is operable to produce unidirectional signals of fixed periods, said energizing means being operable in response to changes in the voltage of said input electric signal to vary the mark/space ratio of said unidirectional signals.

17. Apparatus according to claim 16 wherein the energizing means includes a servo-control circuit for providing an output signal which is the mean value of the current supplying the coil with respect to the operating value constituted by the input electric signal, means for providing an external periodic signal, and a comparator for receiving the output signal of the servo-control circuit and said external periodic signal.

18. Apparatus according to claim 17 wherein the servo control circuit has a voltage-to-duration converter including a capacitor which is charged at a constant current, said means for providing an external signal comprising an astable multivibrator means for periodically discharging said capacitor.

19. Apparatus according to claim 17 wherein the servo-control circuit includes a main feedback loop which includes an integrator for supplying a signal representing the mean value of the current in the electromagnetic coil means.

20. An electrohydraulic transducer, comprising,
a body of magnetic material having a core provided with a fluid passage extending therethrough to an outlet opening which is located at one end of the core,
an electromagnetic coil means mounted on said core,
a substantially flat movable magnetic element mounted at said one end of the core,
a nonmagnetic closure member mounted between said movable magnetic element and said outlet opening,
means for energizing said electromagnetic coil means with a unidirectional pulsed electric current which is operable to vibrate said movable magnetic element,
said movable magnetic element, when vibrated, biasing the closure member to counteract the hydraulic force of fluid from the fluid passage, and controlling the pressure within said fluid passage by controlling the rate of fluid flow through the outlet opening,
said energizing means including a servo-control circuit for providing an output signal which is the mean value of the current supplying the coil with respect to the operating value constituted by the input electric signal, means for providing an external periodic signal, and a comparator for receiving the output signal of the servo-control circuit and said external periodic signal.

21. Apparatus according to claim 20 wherein the servo control circuit has a voltage-to-duration converter including a capacitor which is charged at a constant current, said means for providing an external signal comprising an astable multivibrator means for periodically discharging said capacitor.

22. Apparatus according to claim 20 wherein the servo-control circuit includes a main feedback loop which includes an integrator for supplying a signal representing the mean value of the current in the electromagnetic coil means.

* * * * *